United States Patent
Ortner et al.

(10) Patent No.: US 12,162,251 B2
(45) Date of Patent: Dec. 10, 2024

(54) MULTILAYER FILM WITH IMPROVED PROPERTIES

(71) Applicant: BOREALIS AG, Linz (AT)

(72) Inventors: Stefan Ortner, Linz (AT); Peter Niedersuess, Linz (AT); Luca Boragno, Linz (AT); Markus Gahleitner, Linz (AT)

(73) Assignee: BOREALIS AG, Vienna (AT)

( * ) Notice: Subject to any disclaimer, the term of this patent is extended or adjusted under 35 U.S.C. 154(b) by 134 days.

(21) Appl. No.: 17/781,069

(22) PCT Filed: Dec. 1, 2020

(86) PCT No.: PCT/EP2020/083997
§ 371 (c)(1),
(2) Date: May 31, 2022

(87) PCT Pub. No.: WO2021/110615
PCT Pub. Date: Jun. 10, 2021

(65) Prior Publication Data
US 2023/0001674 A1    Jan. 5, 2023

(30) Foreign Application Priority Data
Dec. 5, 2019 (EP) .................................. 19213791

(51) Int. Cl.
*B32B 27/08* (2006.01)
*B32B 7/027* (2019.01)
(Continued)

(52) U.S. Cl.
CPC .............. *B32B 27/08* (2013.01); *B32B 7/027* (2019.01); *B32B 27/18* (2013.01); *B32B 27/32* (2013.01);
(Continued)

(58) Field of Classification Search
CPC ......................................... B32B 27/32–27/327
See application file for complete search history.

(56) References Cited

U.S. PATENT DOCUMENTS

| 6,727,000 B2 | 4/2004 | Joly et al. |
| 10,363,719 B2 | 7/2019 | Niedersüss et al. |
(Continued)

FOREIGN PATENT DOCUMENTS

| CA | 2802732 A1 | 7/2014 |
| CN | 103298874 A1 | 9/2013 |
(Continued)

OTHER PUBLICATIONS

Grein et al. "Mechanical and optical effects of elastomer interaction in polypropylene modification: Ethylene-propylene rubber, poly-(ethylene-co-octene) and styrene-butadiene elastomers", eXPRESS Polymer Letters, vol. 6, No. 9, (2012); pp. 688-696.*

(Continued)

*Primary Examiner* — Prashant J Khatri
(74) *Attorney, Agent, or Firm* — Tarolli, Sundheim, Covell & Tummino LLP

(57) ABSTRACT

The present invention relates to a multilayer film comprising at least two outer layers and at least one core layer, at least one of the outer layers comprises component a1), the other outer layer comprises component a1) or a2). Component a1) is a terpolymer of propylene, ethylene and one C4 to C10 α-olefin; having ethylene content in the range of 0.1 to 8.0 wt.-%, C4 to C10 α-olefin content in the range of 0.1 to 16.0 wt.-%, and a melt flow rate MFR$_2$ 0.5 to 12.0 g/10 min. Component a2) is a polypropylene having a melting temperature of at least 150° C. The core layer comprises a heterophasic propylene copolymer b) having MFR$_2$ of 0.3 to 20.0 g/10 min, XCS content of 16.0 to 50.0 wt.-%, and comonomer content of 11.5 to 21.0 mol-%, comprising a matrix being a random propylene copolymer b1) and an (Continued)

elastomeric propylene copolymer b2) dispersed in said matrix.

13 Claims, 1 Drawing Sheet

(51) Int. Cl.
   *B32B 27/18* (2006.01)
   *B32B 27/32* (2006.01)
   *C08L 23/14* (2006.01)

(52) U.S. Cl.
   CPC .......... *C08L 23/14* (2013.01); *B32B 2250/03* (2013.01); *B32B 2250/242* (2013.01); *B32B 2250/40* (2013.01); *B32B 2270/00* (2013.01); *B32B 2307/30* (2013.01); *B32B 2307/4026* (2013.01); *B32B 2307/558* (2013.01); *B32B 2307/72* (2013.01); *B32B 2307/732* (2013.01); *B32B 2307/746* (2013.01); *B32B 2439/70* (2013.01); *B32B 2439/80* (2013.01)

(56) References Cited

U.S. PATENT DOCUMENTS

2005/0238874 A1   10/2005   Pellingra, Jr. et al.
2014/0205847 A1   7/2014   Falla

FOREIGN PATENT DOCUMENTS

| CN | 103608177 A1 | 2/2014 |
| CN | 103748163 A | 4/2014 |
| CN | 104039550 A1 | 9/2014 |
| CN | 104105753 A | 10/2014 |
| EP | 1802464 A1 | 7/2007 |
| EP | 2831168 A1 | 2/2015 |
| EP | 3003708 A1 | 4/2016 |
| EP | 3078490 A1 | 10/2016 |
| RU | 2447996 C2 | 4/2012 |
| RU | 2520209 C2 | 6/2014 |
| WO | 200170500 A1 | 9/2001 |
| WO | 2003031174 A2 | 4/2003 |
| WO | 2010117148 A2 | 10/2010 |
| WO | 2012/007430 A1 | 1/2012 |
| WO | 2015117948 A1 | 8/2015 |
| WO | 2015117958 A1 | 8/2015 |
| WO | 2017016711 A1 | 2/2017 |
| WO | 2018069263 A1 | 4/2018 |
| WO | 2018138235 A1 | 8/2018 |
| WO | 2019038395 A1 | 2/2019 |
| WO | 2019057571 A1 | 3/2019 |

OTHER PUBLICATIONS

Russian Application No. 2022117916/05, Decision to Grant dated May 5, 2023.
Chinese Application No. 202080083283.4, Office Action dated Sep. 8, 2023.
Castignolles, Patrice, et al., "Detection and quantification of branching in polyacrylates by size-exclusion chromotography (SEC) and melt-state 13C NMR Spectroscopy", Polymer 50 (2009) 2373-2383.
Filip, Xenia, et al, "Heteronuclear Decoupling Under Fast Mas by a Rotor-Synchronized Hahn-Echo Pulse Train", Journal of Magnetic Rosonance 176 (2005) 239-243.
Griffin, John M., et al. "Low-Load Rotor-Synchronized Hahn-Echo Pulse Train (RS-HEPT) 1H Decoupling in Solid-State NMR:Factors Affecting Mas Spin-Echo Dephasing Times", Magn. Reson. Chem. 2007; 45:S198-S208.
Parkinson, Matthew, et al., "Effect of Branch Length on 13C NMR Relation Properties in Molten Poly[ethylene-co-(alpha-olefin)] Model Systems", Macromol. Chem, Phys. 2007, 208-2128-2133.
Pollard, M. Pollard, et al., "Observation of Chain Branching in Polyethylene in the Solid State and Melt via 13C NMR Spectroscopy and Melt NMR Relation Time Measurements", Macromolecules 2004, 37, 813-825.
Resconi, Luigi, et al., "Selectivity in Propane Polymerization With Metallocene Catalysts", Chem. Rev. 2000, 100, 1253-1345.
Anita J.; HILLS, Deborah D. NMR spectra of polymers and polymer additives. CRC press, 2000.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1137.
Busico, Vincenzo, et al., "Full Assignment of the 13C NMR Spectra or Regioregular Polypropylenes: Methyl and Methylene Region", Macromolecules 1997, 30, 6251-6263.
Busico, Vincenzo, et al., "Microstructure of Polypropylene", Prog. Polym. Sci. 26 (2001) 443-533.
Cheng, et al., "13C NMR Analysis of Ethylene-Propylene Rubbers", Macromolecules 17, 1984, 1950-1955.
Kakugo, Masahiro, et al., "13C NMR Determination of Monomer Sequence Distribution in Ethylene-Propylene Copolymers Prepared with d-TiC13—Al(C2H5)2 Cl" Macromolecules 1982, 15, 1150-1152.
Klimke, Katja, et al., "Optimisation and Application of Polyolefin Branch Quantification By Melt-State 13CNMR Spectroscopy", Macromol. Chem. Phys. 2006, 207, p. 382-395.
Randall, James c., "A Review of High Resolution Liquid 13carbon Nuclear Magnetic Resonance Characterizations of Ethylene-Based Polymers", Journal of macromolecular science, C29( ):201 1989.
Singh, Gurmeet, et al., "Triad Sequence Determination of Ethylene-Propylene Copolymers—Application of Quantitative 13C NMR", Polymer Testing 28 (2009) 475-479.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Liu, W., Rinaldi, P., McIntosh, L., Quirk, P., Macromolecules 2001, 34, 4757.
Qiu, X., Redwine, D., Gobbi, G., Nuamthanom, A., Rinaldi, P., Macromolecules 2007, 40, 6879.
Applicant: Borealis AG; "Multilayer Film with Improved Properties"; International Application No. PCT/EP2020/083997 Filed Dec. 1, 2020; PCT International Search Report and Written Opinion; Authorized Officer: Koen Bergmans; Jan. 27, 2021; 13 pgs.
Chinese Application No. 202080083283.4, Notice of Allowance dated Apr. 30, 2024.

\* cited by examiner

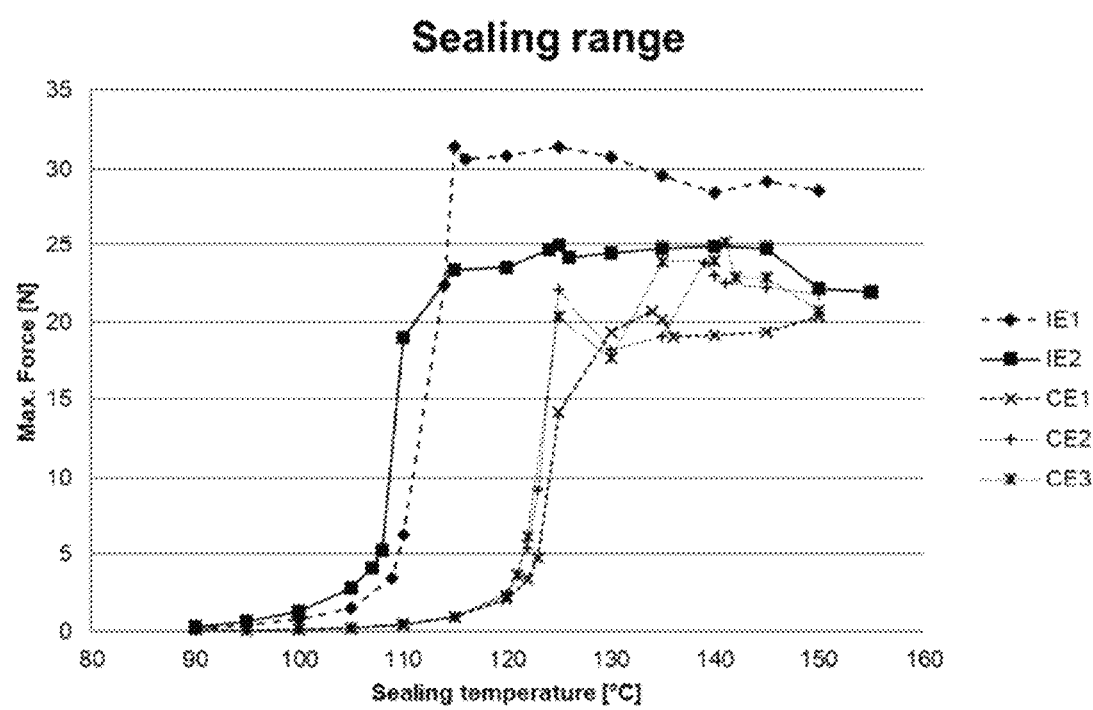

MULTILAYER FILM WITH IMPROVED PROPERTIES

The present invention relates to a multilayer film comprising at least two outer layers (A) and (C), whereby at least one these layers is a sealing layer and at least one core layer (B). In addition, the present invention refers to the use of this multilayer film for soft packaging applications, for medical applications and for pharmaceutical applications.

For packaging applications nowadays high standards are required and quite often properties which are conflicting are needed. In industry, often multilayer films with different materials providing different functions are produced. Polypropylenes are widely used in film making for packaging materials and show good sealing properties and. However, the overall performance of such polypropylene-based multilayer films especially in view of the sealing behavior is inferior compared to polyethylene multilayer systems.

A variety of multilayer films for packaging applications is known in the art. EP 1 802 464 A1 relates to an article of commerce including a disposable cleaning article and a package. The package is formed as a multilayer packaging film including at least a co-extruded vapor barrier film layer and a polymeric film layer having a melting point of at least about 20° C. less than the co-extruded film layer laminated to the co-extruded film layer. The polymeric film layer is sealable to form the package in order to enclose the disposable cleaning article, thereby to substantially retain the water content of the disposable cleaning article.

US 2005/238874 A1 relates to multilayer films that are suitable for packaging. A soft polymer is blended in a core layer and a tie layer comprises the soft polymer and, optionally, another polymer. A sealable layer is provided on the side of the tie layer opposite to the core layer. The multilayer film may be transparent, contain a cavitating agent, or may be pigmented to form an opaque film. The multilayer film may also be metallized or coated with a barrier coating, but will be non-transparent in any case, limiting the application range.

WO 2010/117148 A2 refers to a multilayer medical film, and to the use thereof, and more particularly, to a multilayer medical film comprising: an outer layer comprising one type of polypropylene polymer selected from the group consisting of polypropylene, a polypropylene copolymer, and the combination thereof; an intermediate layer comprising 10 to 60 wt.-% of one type of polypropylene polymer selected from the group consisting of polypropylene, a polypropylene copolymer, and the combination thereof, and 40 to 90 wt.-% of a thermoplastic elastomer; and an inner layer comprising 60 to 80 wt.-% of one type of polypropylene polymer selected from the group consisting of polypropylene, a polypropylene copolymer, and the combination thereof, 10 to 30 wt.-% of polyethylene, and 1 to 10 wt.-% of a thermoplastic elastomer. The high amount of thermoplastic elastomer limits the applicability of these film constructions in terms of cost and heat resistance.

EP 3 003 708 A1 relates to a biaxially oriented, multilayer polypropylene film constituted of at least one base layer and one first intermediate layer and a first sealable cover layer applied to said intermediate layer, the first intermediate layer being a soft intermediate layer and all layers of the film are substantially not containing vacuoles. The film is used for producing bag packaging. Sealing temperatures of 140° C. are applied in the testing, which is much higher than desired.

EP 2 831 168 A1 refers to an unoriented film comprising at least one layer of a polymer composition comprising a styrenic based elastomer and a propylene copolymer. Such modifiers elastomer limit applicability in terms of cost and heat resistance.

WO 2017/016711 A1 relates to a polypropylene composition comprising a crystalline propylene random copolymer and an amorphous propylene copolymer having improved hot-tack force and adhesion properties, to a process for the manufacture thereof, to the use thereof in the manufacture of adhesives and hot tack films and to articles comprising the polypropylene composition, as well as to a process for producing such an article. Such modifiers elastomer limit applicability in terms of cost and heat resistance.

For packaging companies it is of utmost importance to reduce the sealing initiation temperature (SIT) of a packaging film. Even more in the view of a sustainable and circular approach, low sealing temperature, low hot tack temperature (HTT) and high hot tack force (HTF) are required. Lower SIT and higher HTF allows running the packaging lines faster and/or at lower temperatures, thus saving costs and energy.

Starting therefrom it was an objective of the present invention to provide multilayer films having a lower SIT and HTT as well as a higher HTF than the multilayer films known from the prior art. In addition, it was the objective of the present invention to provide multilayer films having mechanical properties being at least on the same level than the materials known from the prior art.

These objects have been solved by the multilayer film according to claim 1 comprising at least two outer layers (A) and (C) and at least one core layer (B), at least one of the outer layers (A) and/or (C) comprises component a1), whereas the other outer layer comprises component a1) or a2), whereby component a1) is a terpolymer of propylene, ethylene and one C4 to C10 α-olefin; whereby said terpolymer a1) has
    an ethylene content in the range of 0.1 to 8.0 wt.-% based on the total weight of the terpolymer a1);
    a C4 to C10 α-olefin content in the range of 0.1 to 16.0 wt.-% based on the total weight of the terpolymer a1); and
    a melt flow rate $MFR_2$ measured according to ISO 1133 (230° C., 2.16 kg load) in the range of 0.5 to 12.0 g/10 min;

component a2) is a polypropylene having a melting temperature of at least 150° C.; and layer (B) comprises a heterophasic propylene copolymer b), said heterophasic propylene copolymer b) comprises a matrix being a random propylene copolymer b1) and an elastomeric propylene copolymer b2) dispersed in said matrix; whereby the heterophasic propylene copolymer b) has
    a melt flow rate $MFR_2$ measured according to ISO 1133 (230° C., 2.16 kg load) in the range of 0.3 to 20.0 g/10 min;
    a xylene cold soluble content (XCS) determined according ISO 16152 (25° C.) in the range of 16.0 to 50.0 wt.-%; and
    a comonomer content in the range of 11.5 to 21.0 mol-%.

It was surprisingly found by the inventors that by modifying the core layer in a multilayer film structure, a relevant effect on the sealing properties is obtained. This effect is unexpected, since the core layer is not directly involved in the sealing. The different heat transfer through the core layer may be the reason behind this remarkable and unexpected technical effect.

The present invention further relates to the use of a multilayer film according to the present invention for soft packaging applications, preferably pouches for food packaging, for medical applications or for pharmaceutical applications.

Definitions

Indications of Quantity

At least one of the outer layers (A) or (C) of the multilayer film in accordance with the present invention comprises component a1) and may additionally comprise component c), additives and admixtures. The other outer layer may comprise component a1) or a2) and optionally component c), additives and admixtures. Core layer (B) comprises component b) and optionally component c), additives and admixtures.

The requirement applies here that in layer (A) or (C) the components a1) or a2) and if present component c) and the additive and admixtures add up to 100 wt.-% in sum. For layer (B) the requirement applies that component b) and if present component c), additives and admixtures add up to 100 wt.-%. This means for example in case that only components a1) and c) are present in one of the outer layers these both components add up to 100 wt.-%, whereas in case that components a1) and c) and additives are present these three components add up to 100 wt.-%. The fixed ranges of the indications of quantity for the individual components are to be understood such that an arbitrary quantity for each of the individual components can be selected within the specified ranges provided that the strict provision is satisfied that the sum of all the components add up to 100 wt.-%.

The expression "sealing layer" is understood herein as used in the technical field of packaging, i.e. the term "sealing layer" indicates that said layer can be used for sealing purposes, i.e. on the surface of this layer or part of this layer the sealing can take place.

The expression "head shield layer" is understood as known in the art in this technical field, i.e. as a layer which does not melt during heat sterilization.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Component a1)

At least one of the outer layers (A) or (C) of the multilayer film according to the present invention comprises component a1). Component a1) is a terpolymer of propylene, ethylene and one C4 to C10 α-olefin. Said terpolymer a1) has an ethylene content in the range of 0.1 to 8.0 wt.-% based on the total weight of the terpolymer a1), a C4 to C10 α-olefin content in the range of 0.1 to 16.0 wt.-% based on the total weight of the terpolymer a1) and a melt flow rate $MFR_2$ measured according to ISO 1133 (230° C., 2.16 kg load) in the range of 0.5 to 12.0 g/10 min.

Below preferred embodiments of component a1) according to the present invention will be discussed.

According to one preferred embodiment of the present invention component a1) has a melting temperature (Tm) determined by differential scanning calorimetry (DSC) of not higher than 145° C., preferably in the range of 115 to 144° C., more preferably in the range of 120 to 143° C., still more preferably in the range of 122 to 142° C. and most preferably in the range of 126 to 138° C.

Another preferred embodiment of the present invention stipulates that component a1) has a glass transition temperature (Tg) determined by dynamic mechanical analysis (DMA) in the range of −12 to +5° C., preferably in the range of −10 to +4° C. and more preferably in the range of −8 to +3.5° C.

In a further preferred embodiment of the present invention component a1) has a crystallization temperature (Tc) determined by differential scanning calorimetry (DSC) of equal or higher than 90° C., preferably in the range of 92° C. to 105° C. and more preferably in the range of 94 to 103° C.

Still another preferred embodiment stipulates that component a1) is a terpolymer of ethylene, propylene and 1-butene.

A further preferred embodiment stipulates that component a1) has an ethylene content in the range of 0.3 to 5.0 wt.-% and preferably in the range of 0.5 to 1.5 wt.-% based on the total weight of the terpolymer a1).

In still another preferred embodiment component a1) has a C4 to C10 α-olefin content in the range of 0.5 to 12.0 wt.-% and preferably in the range of 5 to 10 wt.-% based on the total weight of the terpolymer a1), whereby the α-olefin preferably is 1-butene.

According to a further preferred embodiment component a1) has a melt flow rate $MFR_2$ measured according to ISO 1133 (230° C., 2.16 kg load) in the range of 2.0 to 10.0 g/10 min and preferably in the range of 4.0 to 8.0 g/10 min.

Still another preferred embodiment stipulates that component a1) has a molecular weight distribution (Mw/Mn) of more than 3.0, preferably in the range of 3.0 to 16, more preferably in the range of 3.5 to 12.0 and most preferably in the range of 4.0 to 9.0.

According to a further preferred embodiment component a1) has a crystallization temperature (Tc) determined by differential scanning calorimetry (DSC) of equal or higher than 90° C.

In another preferred embodiment component a1) is produced in the presence of a Ziegler Natta catalyst (ZN-C). Preferably the polymerization process is conducted in the presence of a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably a non-phthalic acid ester b) a co-catalyst (Co), and c) optionally an external donor (ED). Preferred international donors are selected from the group consisting of malonates, maleates, citraconate, succinates, glutarates, cyclohexene-1,2-dicarboxylates, benzoates and derivatives and/or mixtures thereof, preferably the internal donor (ID) is a citraconate.

Conditions for manufacturing component A) are inter alia described in WO 2018/069263 A1.

Component a2)

One of the outer layers of the multilayer film according to the present invention may comprise component a2). Component a2) is a polypropylene having a melting temperature of at least 150° C.

In the following preferred embodiments of component a2) according to the present invention will be discussed.

According to one preferred embodiment of the present invention component a2) is a propylene homopolymer having a melting temperature of at least 158° C., preferably in the range of 158 to 167° C.

Still another preferred embodiment stipulates that component a2) has a melt flow rate $MFR_2$ (230° C., 2.16 kg) in the range of 0.5 to 20.0 g/10 min and preferably in the range of 0.5 to 10.0 g/10 min.

In a further preferred embodiment component a2) is a propylene copolymer having a melting temperature of at least 150° C. and preferably in the range of 150 to 160° C. The comonomer content, preferably the ethylene content, is not more than 3.5 wt.-% and preferably in the range from 0.01 to 3.5 wt.-%. In addition, it is preferred that the propylene copolymer has a melt flow rate $MFR_2$ (230° C., 2.16 kg) in the range of 0.5 to 20.0 g/10 min and preferably in the range of 0.5 to 10.0 g/10 min.

A preferred material for component a2) is inter alia commercially available from Borealis AG (Austria) under the trade name HD601CF. Alternative suitable materials are high crystallinity polypropylene hompolymers as described for example in WO 03/031174 A2.

Component b)

The core layer of the multilayer film according to the present invention comprises component b), being a heterophasic propylene copolymer. Said heterophasic propylene copolymer b) comprises a matrix being a random propylene copolymer b1) and an elastomeric propylene copolymer b2) dispersed in said matrix. The heterophasic propylene copolymer b) has a melt flow rate $MFR_2$ measured according to ISO 1133 (230° C., 2.16 kg load) in the range of 0.3 to 20.0 g/10 min, a xylene cold soluble content (XCS) determined according to ISO 16152 (25° C.) in the range of 16.0 to 50.0 wt.-% and a comonomer content in the range of 11.5 to 21.0 mol-%.

In the following preferred embodiments of component b) according to the present invention will be discussed.

According to one preferred embodiment of the present invention component b) has a Charpy Notched Impact Strength as defined by in-equation (I)

$$NIS > 60 - 23.0 \times \ln(MFR) \quad (I)$$

wherein "NIS" is the Charpy Notched Impact Strength according to ISO 179-1eA:2000 at 23° C. [in $kJ/m^2$] of the heterophasic propylene copolymer b); and "MFR" is the $MFR_2$ (230° C./2.16 kg) [in g/10 min] of the heterophasic propylene copolymer b).

Still another preferred embodiment stipulates that component b) has at least two glass transition temperatures $Tg(1)$ and $Tg(2)$, the first glass transition temperature $Tg(1)$ relates to the matrix b1) while the second glass transition temperature $Tg(2)$ relates to the dispersed elastomeric propylene copolymer b2), wherein further the second glass transition temperature $Tg(2)$ fulfills in-equation (II);

$$Tg(2) > 21.0 - 2.0 \times C(XCS) \quad (II)$$

wherein $Tg(2)$ is the second glass transition temperature of the heterophasic propylene copolymer b); and $C(XCS)$ is the comonomer content [in mol-%] of the xylene cold soluble fraction (XCS) of the heterophasic propylene copolymer (b).

In a further preferred embodiment of the present invention the heterophasic propylene copolymer b) has a melt flow rate $MFR_2$ measured according to ISO 1133 (230° C., 2.16 kg load) in the range of 0.5 to 15.0 g/10 min, preferably in the range of 2.0 to 10 g/10 min and more preferably in the range of 6.0 to 8.0 g/10 min.

According to a further preferred embodiment of the present invention component b) has a xylene cold soluble content (XCS) determined according ISO 16152 (25° C.) in the range of 16.0 to 35.0 wt.-%, preferably in the range of 18.0 to 30.0 wt.-% and more preferably in the range of 19.0 to 25.0 wt.-%.

Still another preferred embodiment of the present invention stipulates that component b) has a comonomer content in the range of 12.0 to 19.0 mol-%, preferably in the range of 12.5 to 17.5 mol-% and more preferably in the range of 12.5 to 16.0 mol-%.

According to another preferred embodiment of the present invention component b) has a C2-content in the range of 2.0 to 15.0 wt.-%, preferably in the range of 4.0 to 14.0 wt.-% and more preferably in the range of 5.0 to 13.0 wt.-% based on the overall weight of component b).

In still another preferred embodiment of the present invention component b) is a random-heterophasic propylene copolymer having a C2C3 random copolymer matrix and a disperse C2C3 elastomer phase.

According to another preferred embodiment of the present invention the comonomers of the random propylene copolymer b1) and/or the comonomers of the elastomeric propylene copolymer b2) are ethylene and/or $C_4$ to $C_8$ α-olefin. Most preferably, only ethylene is present as comonomer.

Preferably, it is desired that said random-heterophasic propylene copolymer (RAHECO) is thermos-mechanically stable. Accordingly, it is appreciated that the heterophasic propylene copolymer (RAHECO) has a melting temperature of at least 130° C., more preferably in the range of 130 to 160° C. and still more preferably in the range of 130 to 155° C.

Still another preferred embodiment of the present invention stipulates that component b) is free of phthalic acid esters as well as their respective decomposition products.

According to a further preferred embodiment the xylene cold soluble content (XCS) of component b) has a comonomer content in the range of 36.5 to 50.0 mol-% and/or an intrinsic viscosity (IV) determined according to DIN ISO 1628/1, (in Decalin at 135° C.) in the range of 2.0 to 4.5 dl/g.

In still another preferred embodiment of the present invention the comonomers of component b1) and/or the comonomers of the elastomeric propylene copolymer b2) are ethylene and/or $C_4$ to $C_8$ α-olefin.

A further preferred embodiment of the present invention stipulates that component b) comprises 60.0 to 90.0 wt.-%, based on the total weight of component b), of the random propylene copolymer b1) and 10.0 to 40.0 wt.-%, based on the total weight of the component b), of the elastomeric propylene copolymer b2).

Still another preferred embodiment of the present invention stipulates that component b) has been produced in the presence of a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester, b) optionally a co-catalyst (Co), and c) optionally an external donor (ED).

The internal donor (ID) is preferably selected from optionally substituted malonates, maleates, succinates, glutarates, cyclohexene-1,2-dicarboxylates, benzoates and derivatives and/or mixtures thereof, preferably the internal donor (ID) is a citraconate and the molar-ratio of co-catalyst (Co) to external donor (ED) [Co/ED] is preferably 5 to 45.

According to still another preferred embodiment of the present invention component is produced in in a multistage process comprising at least two reactors, preferably at least three connected in series.

Conditions for manufacturing component b) are inter alia described in WO 2015/117948 A1 and WO 2015/117958 A1.

Component c)

According to a preferred embodiment of the present invention at least one of layers (A), (B) or (C) comprises at least one plastomer as component c).

Preferably component c) is a plastomer comprising ethylene, more preferably a copolymer of ethylene and 1-octene, still more preferably having a density in the range of 0.860 to 0.930 g/cm$^3$, even more preferably having a MFR$_2$ (190° C., 2.16 kg) determined according to ISO 1133 in the range of 0.1 to 40.0 g/10 min and most preferably is a copolymer of ethylene and 1-octene having a density in the range of 0.865 to 0.920 g/cm$^3$ and a MFR$_2$ (190° C., 2.16 kg) determined according to ISO 1133 in the range of 0.3 to 35 g/10 min.

Suitable plastomers as component c) are commercially available from Borealis AG (Austria) under the trade names Queo 8203, Queo 8207LA or Queo 8210. Alternative suitable plastomers are Engage 7256 or Engage 8003 commercially available from Dow Chemical Corp., USA.

Additives and Admixtures

The components as described above may each independently from each other comprise additives, preferably selected from the group consisting of slip agents, UV-stabiliser, pigments, antioxidants, nucleating agents and mixtures thereof, preferably these additives are contained in an amount from 0 to 5000 ppm, preferably from 10 to 5000 ppm and more preferably from 500 to 3000 ppm based on the overall weight of the respective layer.

The components as described above may each independently from each other comprise admixtures, preferably selected from the group consisting of pigments, fillers, antiblocking agents and mixtures thereof, preferably these admixtures are contained in an the range from 0 to 5 wt.-%, preferably in the range from 0 to 3 wt.-%, more preferably in the range from 0 to 2 wt.-% and most preferably from 0 to 1 wt.-% based on the overall weight of the respective layer.

Multilayer Film

The multilayer film according to the present invention comprises at least two outer layers (A) and (C) and at least one core layer (B).

At least one of the outer layers (A) or (C) comprises component a1). The other outer layer may also comprise or consist of component a1), but may in addition comprise or alternatively consist of component a2). In case that component a1) is used the layer is a sealing layer, whereas when component a2) is used the layer is a heat shield layer.

According to one preferred embodiment of the present invention the multilayer film consists of 3 layers; wherein more preferably layers A) and C) are different and more preferably consist of different materials.

Another preferred embodiment of the present invention stipulates that the multilayer film consists of 3 layers; wherein layers A) and C) consist of the same materials and more preferably are identical.

According to another preferred embodiment of the present invention the multilayer film is a cast film.

In a further preferred embodiment of the present invention layer (B) has a thickness in the range of 45 to 95%, preferably in the range of 50 to 90% and more preferably in the range of 70 to 85% with respect to the total thickness of the multilayer film.

Still another preferred embodiment stipulates that the multilayer film has a total thickness in the range of 20 to 300 μm, preferably in the range of 25 to 200 μm and more preferably in the range of 75 to 125 μm.

According to a preferred embodiment of the present invention layers (A) and (C) comprise different materials and layer (C) comprises component a2) selected from the group consisting of a polypropylene homopolymer, a random propylene copolymer and mixtures thereof.

According to a preferred embodiment component a2) is a polypropylene homopolymer having a melt flow rate MFR$_2$ measured according to ISO 1133 (230° C., 2.16 kg load) in the range of 0.3 to 20.0 g/10 min and preferably in the range of 7 to 9 and a xylene cold soluble content (XCS) determined according ISO 16152 (25° C.) in the range of 0.1 to 8.0 wt.-% and preferably in the range of 2.0 to 4.0 wt.-%.

According to another preferred embodiment of the present invention the content of component a1) or component a2) in layer (A) is in the range of 80 to 100 wt.-%, more preferably in the range of 90 to 98 wt.-%, still more preferably in the range of 94 to 98 wt.-% based on the overall weight of layer (A) and the content of component c) in layer (A) is in the range of 0 to 20 wt.-%, preferably in the range of 2 to 10 wt.-%, more preferably in the range of 2 to 6 wt.-%, whereby the weight portions of components a1) or a2) and c) add up to 100 wt.-%; and most preferably layer (A) consists of components a1) or a2) and optionally component c) and/or additives and/or admixtures.

A further preferred embodiment of the present invention stipulates that the content of component a1) or component a2) in layer (C) is in the range of 80 to 100 wt.-%, more preferably in the range of 90 to 100 wt.-%, still more preferably in the range of 95 to 100 wt.-% based on the overall weight of layer (C) and most preferably layer (A) consists of components a1) or a2) and optionally additives and/or admixtures.

Still another preferred embodiment of the present invention stipulates the content of component b) in layer (B) is in the range of 60 to 100 wt.-%, more preferably in the range of 70 to 90 wt.-%, still more preferably in the range of 75 to 85 wt.-% based on the overall weight of layer (B) and the content of component c) in layer (B) is in the range of 0 to 40 wt.-%, preferably in the range of 10 to 30 wt.-%, more preferably in the range of 15 to 25 wt.-%, whereby the weight portions of components b) and c) add up to 100 wt.-% and most preferably layer (B) consists of component b) and optionally component c) and/or additives and/or admixtures.

According to a further preferred embodiment of the present invention the content of component c) in layer (B) is in the range of 0 to 40 wt.-%, more preferably in the range of 0 to 30 wt.-%, still more preferably in the range of 10 to 25 wt.-% based on the overall weight of layer (C) and most preferably layer (C) consists of component c) and optionally additives and/or admixtures.

According to a further preferred embodiment of the present invention the content of component c) in layer (C) is in the range of 0 to 20 wt.-%, more preferably in the range of 2 to 10 wt.-%, still more preferably in the range of 2 to 6 wt.-% based on the overall weight of layer (C).

A preferred multilayer film according to the present invention consists of layers (A), (B) and (C); whereby layer (A) comprises and preferably consists of a terpolymer a1) of propylene, ethylene and 1-butene having an ethylene content in the range of 0.1 to 8.0 wt.-% and preferably in the range of 0.5 to 1.5 wt.-% based on the total weight of the terpolymer a1);

a 04-content in the range of 0.1 to 16.0 wt.-% and preferably in the range of 7.5 to 10.5 wt.-% based on the total weight of the terpolymer a1); and a melt flow rate $MFR_2$ measured according to ISO 1133 (230° C., 2.16 kg load) in the range of 0.5 to 12.0 g/10 min and preferably in the range of 4 to 8 g/10 min; and layer (B) comprises and preferably consists of a heterophasic propylene copolymer b), said heterophasic propylene copolymer b) comprises a matrix being a random propylene copolymer b1) and an elastomeric propylene copolymer b2) dispersed in said matrix;

whereby the heterophasic propylene copolymer b) has a melt flow rate $MFR_2$ measured according to ISO 1133 (230° C., 2.16 kg load) in the range of 0.3 to 20.0 g/10 min and preferably in the range of 5 to 9;

a xylene cold soluble content (XCS) determined according ISO 16152 (25° C.) in the range of 16.0 to 50.0 wt.-% and preferably in the range of 20.0 to 25.0 wt.-%;

a comonomer content in the range of 11.5 to 21.0 mol-%; and a C2-content in the range of 3 to 12 wt.-% and preferably in the range of 7 to 9 wt.-% based on the overall weight of component b);

layer (C) comprises and preferably consists of a polypropylene homopolymer a2), said polypropylene homopolymer a2) has a melt flow rate $MFR_2$ measured according to ISO 1133 (230° C., 2.16 kg load) in the range of 0.3 to 20.0 g/10 min and preferably in the range of 7 to 9; and a xylene cold soluble content (XCS) determined according ISO 16152 (25° C.) in the range of 0.1 to 8.0 wt.-% and preferably in the range of 2.0 to 4.0 wt.-%.

According to another preferred embodiment of the present invention layer (A) comprises 2 to 10 wt.-%, preferably 4 to 6 wt.-% based on the overall weight of layer (A) of a copolymer of ethylene and 1-octene having a density in the range of 0.860 to 0.930 g/cm³, preferably in the range of 0.865 to 0.920 g/cm³; and a $MFR_2$ (190° C., 2.16 kg) determined according to ISO 1133 in the range from 0.1 to 40.0 g/10 min and preferably in the range of 0.3 to 35 g/10 min; and/or layer (B) comprises 10 to 35 wt.-%, preferably 22 to 28 wt.-% based on the overall weight of layer (B) of a copolymer of ethylene and 1-octene having a density in the range of 0.860 to 0.930 g/cm³, preferably in the range of 0.865 to 0.920 g/cm³; and a $MFR_2$ (190° C., 2.16 kg) determined according to ISO 1133 in the range from 0.1 to 40.0 g/10 min and preferably in the range of 0.3 to 35 g/10 min.

Use

The present invention also relates to the use of the multilayer film as defined above for soft packaging applications, preferably pouches for food packaging, for medical applications or for pharmaceutical applications.

The invention will now be described with reference to the following non-limiting examples.

EXPERIMENTAL PART

A. Measuring Methods

The following definitions of terms and determination methods apply for the above general description of the invention as well as to the below examples unless otherwise defined.

Melt Flow Rate

The melt flow rate (MFR) was determined according to ISO 1133—Determination of the melt mass-flow rate (MFR) and melt volume-flow rate (MVR) of thermoplastics—Part 1: Standard method and is indicated in g/10 min. The MFR is an indication of the flowability, and hence the processability, of the polymer. The higher the melt flow rate, the lower the viscosity of the polymer. The $MFR_2$ of polyethylene is determined at a temperature of 190° C. and a load of 2.16 kg. The $MFR_2$ of polypropylene is determined at a temperature of 230° C. and a load of 2.16 kg.

Comonomer Content of 1-Octene of a Linear Low Density Polyethylene (LLDPE)

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382; Parkinson, M., Klimke, K., Spiess, H. W., Wilhelm, M., Macromol. Chem. Phys. 2007; 208:2128; Castignolles, P., Graf, R., Parkinson, M., Wilhelm, M., Gaborieau, M., Polymer 50 (2009) 2373; NMR Spectroscopy of Polymers: Innovative Strategies for Complex Macromolecules, Chapter 24, 401 (2011)). Standard single-pulse excitation was employed utilising the transient NOE at short recycle delays of 3 s (Pollard, M., Klimke, K., Graf, R., Spiess, H. W., Wilhelm, M., Sperber, O., Piel, C., Kaminsky, W., Macromolecules 2004; 37:813; Klimke, K., Parkinson, M., Piel, C., Kaminsky, W., Spiess, H. W., Wilhelm, M., Macromol. Chem. Phys. 2006; 207:382.) and the RS-HEPT decoupling scheme (Filip, X., Tripon, C., Filip, C., J. Mag. Resn. 2005, 176, 239; Griffin, J. M., Tripon, C., Samoson, A., Filip, C., and Brown, S. P., Mag. Res. in Chem. 2007 45, S1, S198). A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm (J. Randall, Macromol. Sci., Rev. Macromol. Chem. Phys. 1989, C29, 201.).

Characteristic signals corresponding to the incorporation of 1-octene were observed (J. Randall, Macromol. Sci., Rev. Macromol. Chem. Phys. 1989, C29, 201; Liu, W., Rinaldi, P., McIntosh, L., Quirk, P., Macromolecules 2001, 34, 4757; Qiu, X., Redwine, D., Gobbi, G., Nuamthanom, A., Rinaldi, P., Macromolecules 2007, 40, 6879) and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.37 ppm. This integral is assigned to the unresolved signals corresponding to both $*B6$ and $*\beta B6B6$ sites of isolated (EEOEE) and isolated double non-consecutive (EEOEOEE) 1-octene sequences respectively. To compensate for the influence of the two $*\beta B6B6$ sites the integral of the $\beta\beta B6B6$ site at 24.7 ppm is used:

$$O = I_{*B6+*\beta B6B6} - 2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.57 ppm assigned to the $\alpha\alpha B6B6$ sites accounting for the number of reporting sites per comonomer:

$$OO = 2*I_{\alpha\alpha B6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the $\beta\beta B6B6$ sites accounting for the number of reporting sites per comonomer:

$$OEO = 2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the $\alpha\alpha\gamma B6B6B6$ sites accounting for the number of reporting sites per comonomer:

$$OOO = 3/2*I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (½)*(I_{2S+2B6} + I_{3S+3B6} - 2*O_{total})$$

The ethylene comonomer content was quantified using the integral of the bulk methylene (bulk) signals at 30.00 ppm. This integral included the $\gamma$ and 4B6 sites from 1-octene as well as the $\delta^+$ sites. The total ethylene comonomer content was calculated based on the bulk integral and compensating for the observed 1-octene sequences and end-groups:

$$E_{total} = (½)*[I_{bulk} + 2*O + 1*OO + 3*OEO + 0*OOO + 3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO = (O_{total}/(E_{total} + O_{total}))$$

The total comonomer incorporation of 1-octene in mol percent was calculated from the mole fraction in the standard manner:

$$O[\text{mol \%}] = 100*fO$$

The mole percent ethylene incorporation was calculated from the formula:

$$E[\text{mol \%}] = 100 - O[\text{mol \%}].$$

Comonomer Content of C3C2 Polymers

Quantitative nuclear-magnetic resonance (NMR) spectroscopy was further used to quantify the comonomer content and comonomer sequence distribution of the polymers. Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Comonomer Content in Poly(Propylene-Co-Ethylene-Co-Butene) Terpolymers (Component a1)

Quantitative $^{13}C\{^1H\}$ NMR spectra are recorded in the molten-state using a Bruker Advance III 500 NMR spectrometer operating at 500.13 and 125.76 MHz for $^1H$ and $^{13}C$ respectively. All spectra were recorded using a 13C optimised 7 mm magic-angle spinning (MAS) probehead at 180° C. using nitrogen gas for all pneumatics. Approximately 200 mg of material was packed into a 7 mm outer diameter zirconia MAS rotor and spun at 4.5 kHz. This setup was chosen primarily for the high sensitivity needed for rapid identification and accurate quantification {klimke06, parkinson07, castignolles09}. Standard single-pulse excitation was employed utilising the NOE at short recycle delays {pollard04, klimke06} and the RS-HEPT decoupling scheme{fillip05,griffin07}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to regio defects were not observed {resconi00}. The amount of propene was quantified based on the main $S\alpha\alpha$ methylene sites at 44.1 ppm:

$$P\text{total}=I_{S\alpha\alpha}$$

Characteristic signals corresponding to the incorporation of 1-butene were observed and the comonomer content quantified in the following way. The amount of isolated 1-butene incorporated in PPBPP sequences was quantified using the integral of the $\alpha B2$ sites at 44.1 ppm accounting for the number of reporting sites per comonomer:

$$B=I_{\alpha B2}/2$$

The amount consecutively incorporated 1-butene in PPBBPP sequences was quantified using the integral of the $\alpha\alpha B2$ site at 40.5 ppm accounting for the number of reporting sites per comonomer:

$$BB=2*I_{\alpha\alpha B2}$$

The total 1-butene content was calculated based on the sum of isolated and consecutively incorporated 1-butene:

$$B\text{total}=B+BB$$

The total mole fraction of 1-butene in the polymer was then calculated as:

$$fB=(B\text{total}/(E\text{total}+P\text{total}+B\text{total})$$

Characteristic signals corresponding to the incorporation of ethylene were observed and the comonomer content quantified in the following way. The amount isolated ethylene incorporated in PPEPP sequences was quantified using the integral of the Say sites at 37.9 ppm accounting for the number of reporting sites per comonomer:

$$E=I_{S\alpha\gamma}/2$$

With no sites indicative of consecutive incorporation observed the total ethylene comonomer content was calculated solely on this quantity:

$$E\text{total}=E$$

The total mole fraction of ethylene in the polymer was then calculated as:

$$fE=(E\text{total}/(E\text{total}+P\text{total}+B\text{total})$$

The mole percent comonomer incorporation was calculated from the mole fractions:

$$B[\text{mol \%}]=100*fB$$

$$E[\text{mol \%}]=100*fE$$

The weight percent comonomer incorporation was calculated from the mole fractions:

$$B[\text{wt \%}]=100*(fB*56.11)/((fE*28.05)+(fB*56.11)+((1-(fE+fB))*42.08))$$

$$E[\text{wt \%}]=100*(fE*28.05)/((fE*28.05)+(fB*56.11)+((1-(fE+fB))*42.08))$$

LITERATURE klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239.
griffin07
Griffin, J. M., Tripon, C., Samoson, A., Filip, C., and Brown, S. P., Mag. Res. in Chem. 2007 45, S1, S198.
castignolles09
Castignolles, P., Graf, R., Parkinson, M., Wilhelm, M., Gaborieau, M., Polymer 50 (2009) 2373.
busico01
Busico, V., Cipullo, R., Prog. Polym. Sci. 26 (2001) 443.
busico97

Busico, V., Cipullo, R., Monaco, G., Vacatello, M., Segre, A. L., Macromoleucles 30 (1997) 6251.
zhou07
Zhou, Z., Kuemmerle, R., Qiu, X., Redwine, D., Cong, R., Taha, A., Baugh, D. Winniford, B., J. Mag. Reson. 187 (2007) 225.
busico07
Busico, V., Carbonniere, P., Cipullo, R., Pellecchia, R., Severn, J., Talarico, G., Macromol. Rapid Commun. 2007, 28, 1128.
resconi00
Resconi, L., Cavallo, L., Fait, A., Piemontesi, F., Chem. Rev. 2000, 100, 1253.

Quantification of Microstructure by NMR Spectroscopy (Component b)

Quantitative nuclear-magnetic resonance (NMR) spectroscopy was used to quantify the comonomer content and comonomer sequence distribution of the polymers. Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(111)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing, even when this structural unit was not present. Characteristic signals corresponding to the incorporation of ethylene were observed (see Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (I)):

$$I(E) = \frac{fPEP}{(fEEE + fPEE + fPEP)} \times 100 \quad (I)$$

wherein
  I(E) is the relative content of isolated to block ethylene sequences [in %];
  fPEP is the mol fraction of propylene/ethylene/propylene sequences (PEP) in the sample;
  fPEE is the mol fraction of propylene/ethylene/ethylene sequences (PEE) and of ethylene/ethylene/propylene sequences (EEP) in the sample;
  fEEE is the mol fraction of ethylene/ethylene/ethylene sequences (EEE) in the sample.

Number Average Molecular Weight ($M_n$), Weight Average Molecular Weight ($M_w$) and Molecular Weight Distribution ($M_w/M_n$)

The weight average molecular weight $M_w$ and the molecular weight distribution ($M_w/M_n$, wherein $M_n$ is the number average molecular weight and $M_w$ is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-

Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11500 kg/mol and a set of well characterized broad polypropylene standards. All samples were prepared by dissolving 5 to 10 mg of polymer in 10 mL (at 160° C.) of stabilized TCB (same as mobile phase) and keeping for 3 hours with continuous shaking prior sampling in into the GPC instrument.

Xylene Cold Solubles (XCS)

The xylene soluble (XS) fraction as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

XS %=(100*m*$V_0$)/($m_0$*v); $m_0$=initial polymer amount (g); m=weight of residue (g); $V_0$=initial volume (ml); v=volume of analysed sample (ml).

Melting Temperature $T_m$ and Crystallization Temperature $T_c$

The parameters are determined with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) is determined from the cooling step, while the melting temperature ($T_m$) is determined from the second heating step. Melting and crystallization temperatures were taken as the peaks of endotherms and exotherms.

Glass Transition Temperature Tg

Tg is determined by dynamic mechanical analysis according to ISO 6721-7. The measurements are done in torsion mode on compression moulded samples (40×10×1 $mm^3$) between −100° C. and +150° C. with a heating rate of 2° C./min and a frequency of 1 Hz.

Hot Tack Force

The hot-tack force was determined according to ASTM F1921-12 Method B on a J&B Hot-Tack Tester on a 100 μm thickness film produced on a three-layer cast film co-extrusion line as described below. All film test specimens were prepared in standard atmospheres for conditioning and testing at 23° C. and 50% relative humidity. The minimum conditioning time of test specimen in standard atmosphere before start testing is at least 16 h. The minimum storage time between extrusion of film sample and start testing is at least 88 h. The hot tack measurement determines the strength of heat seals formed in the 5 films, immediately after the seal has been made and before it cools to ambient temperature. The hot-tack measurement was performed under the following conditions.

Film Specimen width: 25 mm
Seal bar length: 50 mm
Seal bar width: 5 mm
Seal bar shape: flat
Seal Pressure: 0.15 N/mm$^2$
Seal Time: 1 sec
Cool time: 0.2 sec
Peel Speed: 200 mm/sec
Start temperature: 90° C.
End temperature: 140° C.
Increments: 5° C.

The hot tack force was measured as a function of temperature within the temperature range and with temperature increments as indicated above. The number of test specimens were at least 3 specimens per temperature. The output of this method is a hot tack curve; a force vs. temperature curve. The Hot Tack force is evaluated from the curve as the highest force (maximum peak value) with failure mode "peel", the Hot tack temperature is the one associated to that force.

Sealing Initiation Temperature (SIT); (Sealing End Temperature (SET), Sealing Range)

The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of 5+/−0.5 N is achieved. The upper limit (sealing end temperature (SET)) is reached, when the films stick to the sealing device. The sealing range was determined on a J&B Universal Sealing Machine Type 3000 with a 100 μm thickness film produced on a three-layer cast film co-extrusion line as described below with the following further parameters:

Specimen width: 25 mm
Seal Pressure: 0.67 N/mm2
Seal Time: 1 sec
Cool time: 30 sec
Peel Speed: 42 mm/sec
Start temperature: 80° C.
End temperature: 150° C.
Increments: 5° C.

Specimen is sealed A to A at each sealbar temperature and seal strength (force) is determined at each step. The temperature is determined at which the seal strength reaches 5+/−0.5 N. The Sealing range curves are presented in FIG. 1.

Tensile Modulus and Tensile Strength

Tensile modulus and tensile strength in machine direction (MD) and transverse direction (TD) was determined according to ISO 527-3 at 23° C. on 100 μm cast films produced as described below. Testing was performed at a cross head speed of 1 mm/min for the linear modulus range, and at 10 mm/min for higher deformations.

Instrumented Puncture Test

The impact strength of films is determined by the instrumented puncture test according to ISO 7765-2 at 0° C. on a 100 μm thickness film produced on a three-layer cast film co-extrusion line as described below. The energy to peak [J/mm] represents the energy absorption in failure up to the peak force [N/mm], while the relative total penetration energy [J/mm] is the total integral that a film can absorb before it breaks, using a test speed of 4.4 m/s. All values are normalized by the film thickness. The higher these values are, the tougher is the material.

Protrusion Puncture Test

The resistance of the films to slow puncture is determined by the protrusion puncture resistance test according to ASTM D5748 at 23° C. on a 100 μm thickness film produced on a three-layer cast film co-extrusion line as described below. Both the energy to maximum force [J/mm] and the energy to break [J/mm] are recorded at a test speed of 250 mm/min.

B. Materials Used

Terpolymer, Component a1)

The terpolymer used in the sealing layer of the inventive examples is the polymer TP2 used in inventive example IE2 and comparative example CE2 of WO 2018/069263 A1, based on a non-phthalate Ziegler-Natta catalyst as described for example in WO 2012/007430 A1. This terpolymer has a 1-butene content of 8.9 wt.-%, an ethylene content of 1.0 wt.-% and an MFR 230° C./2.16 kg of 7.1 g/10 min.

RAHECO, Component b)

The RAHECO used in the core layer of the inventive examples is the polymer of comparative example CE4 of WO 2019/038395 A1, based on the non-phthalate Ziegler-Natta catalyst of WO 2015/117948 A1, having an XCS content of 20 wt.-%, a total ethylene content of 8.0 wt.-% and an MFR 230° C./2.16 kg of 7.0 g/10 min.

HECO

The HECO used in the core layer of the comparative examples is the polymer of inventive example IE2b (visbroken) of WO 2018/138235 A1 having an XCS content of 15.5 wt.-%, a total ethylene content of 6.8 wt.-% and an MFR 230° C./2.16 kg of 5.7 g/10 min.

Random PP (RE216CF)

RE216CF is an ethylene-propylene random copolymer having a melting temperature of 145° C., available from Borealis AG, Austria (density: 905 kg/m$^3$, MFR 230° C./2.16 kg=11.0 g/10 min).

PPH (HD601CF), Component a2)

HD601CF is a polypropylene homopolymer available from Borealis AG, Austria (density: 910 kg/m$^3$, MFR 230° C./2.16 kg=8.0 g/10 min).

Vistamaxx 6202 (Vistamaxx)

Vistamaxx 6202 is a metallocene-based propylene copolymer having an ethylene content of 15 wt.-%, available from ExxonMobil Chemical, USA (density: 862 kg/m$^3$, MFR 200° C./2.16 kg=20 g/10 min).

Plastomer (Queo 8203), Component c)

Queo 8203 is an ethylene-based octene plastomer available from Borealis AG, Austria (density: 883 kg/m$^3$, MFR 190° C./2.16 kg=3.0 g/10 min).

C. Manufacturing of Multilayer Films

The multilayer films according to the Inventive Examples (IE) and the Comparative Examples (CE) have been produced on a multilayer cast film line equipped with 3 extruders. All three extruders were equipped with a notched feeding zone and a 3-zone screw with mixing and shear parts. The diameter of the cylinder of extruder A is 40 mm and the screw length 25D. Extruder B has a cylinder diameter of 60 mm and a screw length of SOD and extruder C a cylinder diameter of 45 mm and a screw length of 25D. Each extruder was fed by a gravimetric dosing system. A feed block with lamellas and following distribution was used as co-extrusion adapter: Extruder A 10% (skin layer), extruder C 80% (core layer) and extruder B 10% (inner layer). A coat hanger die with automatic die gap regulation was used, die width 800 mm and die gap 0.5 mm. The chill roll unit has a diameter of 450 mm and the 2nd cooling roll 250 mm. The detailed processing parameters are shown in Table 1 below. Table 2 summarizes the produced multilayer films, which all had an overall thickness of 100 μm.

TABLE 1

Processing conditions for three layer cast films.

| | | Extruder A | Extruder C | Extruder B |
|---|---|---|---|---|
| Layer thickness | [μm] | 10 | 80 | 10 |
| Layer | | Outer layer (A) | Core layer (B) | Outer layer (C) |
| Melt temperature | °C. | 250 | 260 | 250 |
| Melt pressure | Bar | 45 | 45 | 45 |
| Screw speed | U/min | 8 | 45 | 6 |
| output | Kg/h | 6 | 48 | 6 |
| Coex adapter temperature | | | 260 | |
| Die temperature | | | 250 | |
| Chill roll temperature | °C. | | 12 | |
| 2$^{nd}$ cooling roll temperature | °C. | | 21 | |
| Take off speed winder | m/min | | 7.4 | |

TABLE 2

Produced multilayer films.

| | IE1 | IE2 | CE1 | CE2 | CE3 |
|---|---|---|---|---|---|
| Layer (A) | Terpolymer | Terpolymer Plastomer | Random PP | Random PP | Random PP |
| Amount [wt.-%] | 100 | 95 5 | 100 | 100 | 100 |
| Layer (B) | RAHECO | RAHECO Plastomer | HECO Vistamaxx | HECO Plastomer | HECO Plastomer |
| Amount [wt.-%] | 100 | 75 25 | 50 50 | 75 25 | 60 40 |
| Layer (C) | PPH | PPH | PPH | PPH | PPH |
| Amount [wt.-%] | 100 | 100 | 100 | 100 | 100 |
| Total Thickness [μm] | 100 | 100 | 100 | 100 | 100 |

D. Results

TABLE 3

Properties of the multilayer films.

| | Unit | IE1 | IE2 | CE1 | CE2 | CE3 |
|---|---|---|---|---|---|---|
| Hot Tack Force | N | 3.91 | 6.38 | 3.95 | 3.56 | 2.44 |
| Hot Tack Temperature | °C. | 105 | 100 | 126 | 110 | 100 |
| Max. Force | N | 31.41 | 24.95 | 20.71 | 23.83 | 25.25 |
| SIT | °C. | 110 | 108 | 123 | 122 | 122 |

TABLE 3-continued

Properties of the multilayer films.

| | Unit | IE1 | IE2 | CE1 | CE2 | CE3 |
|---|---|---|---|---|---|---|
| Tensile test | | | | | | |
| Tensile Modulus MD | MPa | 471 | 416 | 274 | 535 | 440 |
| Tensile Modulus TD | MPa | 442 | 379 | 228 | 471 | 384 |
| Tensile Strength MD | MPa | 37 | 36 | 29 | 40 | 34 |
| Tensile Strength TD | MPa | 30 | 32 | 31 | 30 | 32 |
| Instrumented puncture test | | | | | | |
| Energy to Peak | J/mm | 10.8 | 27.9 | 21.8 | 27.9 | 25.6 |
| Peak Force | N/mm | 1052 | 1155 | 1045 | 1185 | 1141 |
| Total Penetration | J/mm | 17.4 | 28.5 | 22.8 | 28.6 | 26.3 |
| Protrusion resistance test | | | | | | |
| Energy to Break | J/mm | 85 | 98 | 73 | 85 | 83 |
| Energy to Maximum Force | J/mm | 77 | 75 | 53 | 62 | 60 |

E. Discussion of the Results

Table 3 summarizes the tests conducted with the multilayer films according to the Inventive Examples IE1 and IE2 and the Comparative Examples CE1 to CE3. When comparing the data, it is necessary to take into account, that IE2 and all Comparative Examples contain a plastomer, whereas IE1 is free of plastomers. The skilled person is well aware that the plastomer influences the properties of the films, therefore IE2 is suited for a comparison of the properties with the films according to the Comparative Examples. However, IE1 demonstrates that films with very good sealing properties are also obtainable without the presence of a plastomer in one of the layers.

From Table 3 can be gathered that the multilayer films IE1 and IE2 according to the present invention have a lower sealing initiation temperature (=SIT) than the multilayer films according to the Comparative Examples CE1 to CE3. In addition, it is possible to increase the Hot Tack Force of the multilayer films according to the present invention by addition of a plastomer (comparison of IE2 with IE1). The multilayer film according to IE2 shows a significantly higher Hot Tack Force than the multilayer films according to the Comparative Examples. Furthermore, the multilayer films according to the present invention IE1 and IE2 have a reduced Hot Tack Temperature and an increased Max. Force compared to CE1 to CE3.

In addition, the multilayer films according to IE1 and IE2 show a higher Energy to Break and Energy to Maximum Force than the multilayer films according to the Comparative Examples, whereas the remaining mechanical properties are approximately at the same level.

To sum it up, the sealing properties of the multilayer films according to the Inventive Examples IE1 and IE2 are much better than for the multilayer films according to Comparative Examples CE1 to CE3 and the multilayer films according to the present invention show improved mechanical properties, especially Energy to Break and Energy to Maximum Force.

The invention claimed is:

1. A multilayer film comprising at least two outer layers (A) and (C) and at least one core layer (B), the outer layer (A) comprises component a1), whereas the outer layer (C) comprises component a1) or a2), the content of component a1) in layer (A) being in the range of 90 to 98 wt. % based on the overall weight of layer (A), whereby:
    component a1) is a terpolymer of propylene, ethylene and one C4 to C10 α-olefin; whereby said terpolymer a1) has:
        an ethylene content in the range of 0.1 to 8.0 wt. % based on the total weight of the terpolymer a1);
        a C4 to C10 α-olefin content in the range of 0.1 to 16.0 wt. % based on the total weight of the terpolymer a1); and
        a melt flow rate $MFR_2$ measured according to ISO 1133 (230° C., 2.16 kg load) in the range of 0.5 to 12.0 g/10 min;
    component a2) is a polypropylene having a melting temperature of at least 150° C.; and
    layer (B) comprises a heterophasic propylene copolymer b), said heterophasic propylene copolymer b) comprises a matrix being a random propylene copolymer b1) and an elastomeric propylene copolymer b2) dispersed in said matrix; whereby the heterophasic propylene copolymer b) has:
        a melt flow rate $MFR_2$ measured according to ISO 1133 (230° C., 2.16 kg load) in the range of 0.3 to 20.0 g/10 min;
        a xylene cold soluble content (XCS) determined according ISO 16152 (25° C.) in the range of 16.0 to 50.0 wt. %; and
        a comonomer content in the range of 11.5 to 21.0 mol %.

2. The multilayer film according to claim 1, wherein component a1):
    has a melting temperature (Tm) determined by differential scanning calorimetry (DSC) of not higher than 145° C.; and/or
    has a glass transition temperature (Tg) determined by dynamic mechanical analysis (DMA) in the range of −12 to +5° C.; and/or
    has a crystallization temperature (Tc) determined by differential scanning calorimetry (DSC) of equal or higher than 90° C.; and/or
    is a terpolymer of ethylene, propylene and 1-butene.

3. The multilayer film according to claim 1, wherein component a1) has:
    an ethylene content in the range of 0.3 to 5.0 wt. % based on the total weight of the terpolymer a1); and/or
    a C4 to C10 α-olefin content in the range of 0.5 to 12.0 wt. % based on the total weight of the terpolymer a1), whereby the α-olefin preferably is 1-butene; and/or a melt flow rate MFR$_2$ measured according to ISO 1133 (230° C., 2.16 kg load) in the range of 2.0 to 10.0 g/10 min; and/or a molecular weight distribution (Mw/Mn) of more than 3.0.

4. The multilayer film according to claim 1, wherein component a2) is a propylene homopolymer having:
a melting temperature of at least 158° C.; and/or
a melt flow rate MFR$_2$ (230° C., 2.16 kg) in the range of 0.5 to 20.0 g/10 min; or component a2) is a propylene copolymer having:
a melting temperature of at least 150° C.; and/or
a comonomer content of not more than 3.5 wt. %; and/or
a melt flow rate MFR$_2$ (230° C., 2.16 kg) in the range of 0.5 to 20.0 g/10 min.

5. The multilayer film according to claim 1, wherein:
the heterophasic propylene copolymer b) has:
a Charpy Notched Impact Strength as defined by in-equation (I):

$$NIS > 60 - 23.0 \times \ln(MFR) \quad (I)$$

wherein
"NIS" is the Charpy Notched Impact Strength according to ISO 179-1eA:2000 at 23° C. [in KJ/m$^2$] of the heterophasic propylene copolymer b); and
"MFR" is the MFR$_2$ (230° C./2.16 kg) [in g/10 min] of the heterophasic propylene copolymer b); and/or
at least two glass transition temperatures Tg(1) and Tg(2), the first glass transition temperature Tg(1) relates to the matrix b1) while the second glass transition temperature Tg(2) relates to the dispersed elastomeric propylene copolymer b2), wherein further the second glass transition temperature Tg(2) fulfills in-equation (II);

$$Tg(2) > 21.0 - 2.0 \times C(XCS) \quad (II)$$

wherein
Tg(2) is the second glass transition temperature of the heterophasic propylene copolymer b); and
C(XCS) is the comonomer content [in mol %] of the xylene cold soluble fraction (XCS) of the heterophasic propylene copolymer (b).

6. The multilayer film according to claim 1, wherein:
the heterophasic propylene copolymer b) has:
a melt flow rate MFR$_2$ measured according to ISO 1133 (230° C., 2.16 kg load) in the range of 0.5 to 15.0 g/10 min; and/or
a xylene cold soluble content (XCS) determined according ISO 16152 (25° C.) in the range of 16.0 to 35.0 wt. %; and/or
a comonomer content in the range of 12.0 to 19.0 mol %; and/or
an ethylene content in the range of 2.0 to 15.0 wt. % based on the overall weight of component b); and/or
a matrix being a random propylene copolymer b1, which is a copolymer of propylene and ethylene and an elastomeric propylene copolymer b2) dispersed in said matrix, the elastomeric propylene copolymer b2) being a copolymer of propylene and ethylene.

7. The multilayer film according to claim 1, wherein:
the comonomers of the random propylene copolymer b1) and/or the comonomers of the elastomeric propylene copolymer b2) are ethylene and/or C$_4$ to C$_8$ α-olefin.

8. The multilayer film according to claim 1:
layers (A) and (C) comprise different materials and layer (C) comprises component a2) selected from the group consisting of a polypropylene homopolymer, a random propylene copolymer and mixtures thereof.

9. The multilayer film according to claim 1, wherein:
at least one of layers (A), (B) or (C) further comprises at least one plastomer as component c) and component c) is a plastomer comprising ethylene having a density in the range of 0.860 to 0.930 g/cm$^3$ and having a MFR$_2$ (190° C., 2.16 kg) determined according to ISO 1133 in the range of 0.1 to 40.0 g/10 min.

10. The multilayer film according to claim 1, wherein:
the components according to layers (A), (B) and/or (C) each independently from each other comprise additives selected from the group consisting of slip agents, UV-stabiliser, pigments, antioxidants, nucleating agents and mixtures thereof; and/or
the components according to layer (A), (B) and/or (C) each independently from each other comprise admixtures selected from the group consisting of pigments, fillers, antiblocking agents and mixtures thereof.

11. The multilayer film according to claim 1, wherein:
the multilayer film consists of 3 layers; wherein layers A) and C) are different; or
the multilayer film consists of 3 layers; wherein layers A) and C) consist of the same materials; and/or
the multilayer film is a cast film; and/or
layer (B) has a thickness in the range of 45 to 95% with respect to the total thickness of the multilayer film; and/or
the multilayer film has a total thickness in the range of 20 to 300 μm.

12. The multilayer film according to claim 1, wherein:
the multilayer film consists of layers (A), (B) and (C); whereby
layer (A) comprises a terpolymer a1) of propylene, ethylene and 1-butene having:
an ethylene content in the range of 0.1 to 8.0 wt. % based on the total weight of the terpolymer a1);
a content of 1-butene in the range of 0.1 to 16.0 wt. % based on the total weight of the terpolymer a1); and
a melt flow rate MFR$_2$ measured according to ISO 1133 (230° C., 2.16 kg load) in the range of 0.5 to 12.0 g/10 min; and layer (B) comprises a heterophasic propylene copolymer b), said heterophasic propylene copolymer b) comprises a matrix being a random propylene copolymer b1) and an elastomeric propylene copolymer b2) dispersed in said matrix; whereby the heterophasic propylene copolymer b) has:
a melt flow rate MFR$_2$ measured according to ISO 1133 (230° C., 2.16 kg load) in the range of 0.3 to 20.0 g/10 min;
a xylene cold soluble content (XCS) determined according ISO 16152 (25° C.) in the range of 16.0 to 50.0 wt. %;
a comonomer content in the range of 11.5 to 21.0 mol %; and
an ethylene content in the range of 3 to 12 wt. % based on the overall weight of component b);

layer (C) comprises a polypropylene homopolymer a2), said polypropylene homopolymer a2) has:
a melt flow rate MFR$_2$ measured according to ISO 1133 (230° C., 2.16 kg load) in the range of 0.3 to 20.0 g/10 min; and
a xylene cold soluble content (XCS) determined according ISO 16152 (25° C.) in the range of 0.1 to 8.0 wt. %.

13. The multilayer film according to claim 1, wherein:
layer (A) further comprises 2 to 10 wt. % based on the overall weight of layer (A) of a copolymer of ethylene and 1-octene having:
- a density in the range of 0.860 to 0.930 g/cm$^3$; and
- a MFR$_2$ (190° C., 2.16 kg) determined according to ISO 1133 in the range from 0.1 to 40.0 g/10 min; and/or layer (B) further comprises 10 to 35 wt. % based on the overall weight of layer (B) of a copolymer of ethylene and 1-octene having:
- a density in the range of 0.860 to 0.930 g/cm$^3$; and
- a MFR$_2$ (190° C., 2.16 kg) determined according to ISO 1133 in the range from 0.1 to 40.0 g/10 min.

\* \* \* \* \*